Jan. 7, 1947.   E. S. WINLUND   2,413,936
REVERBERATION METER
Original Filed June 30, 1942
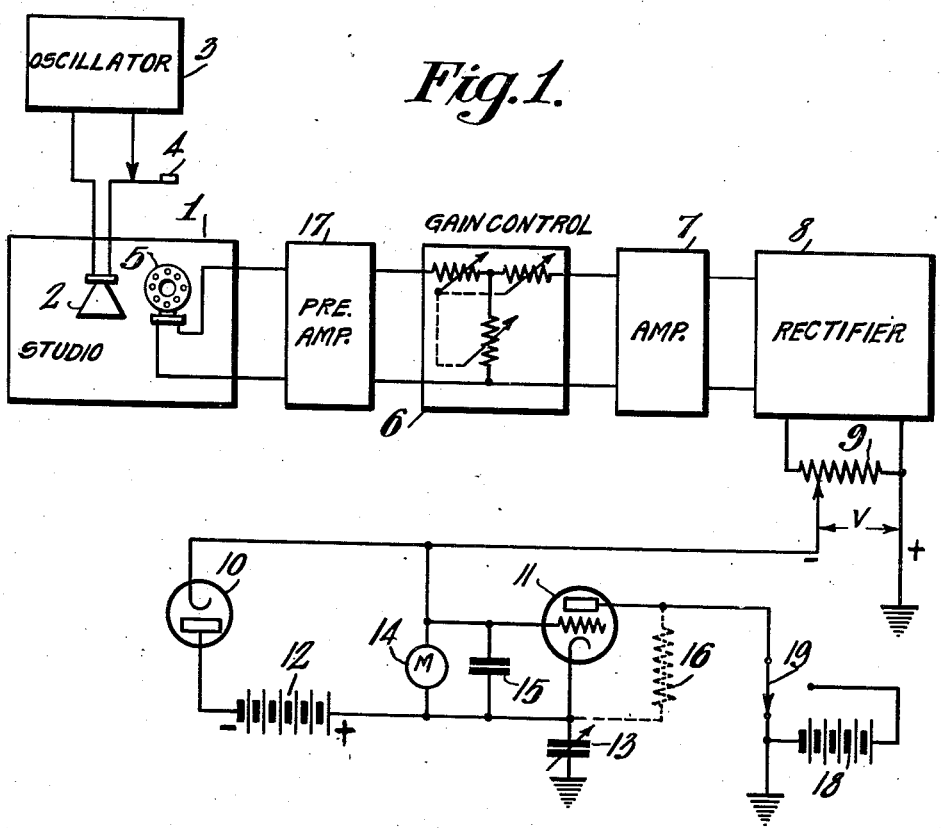
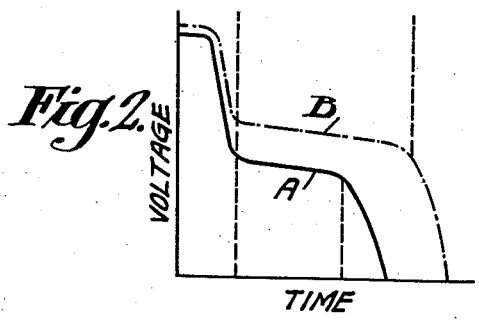
INVENTOR.
Edmond S. Winlund
BY
ATTORNEY Patented Jan. 7, 1947

2,413,936

UNITED STATES PATENT OFFICE 2,413,936

REVERBERATION METER

Edmond S. Winlund, Moorestown, N. J., assignor to Radio Corporation of America, a corporation of Delaware Original application June 30, 1942, Serial No. 449,178. Divided and this application January 24, 1945, Serial No. 574,289

3 Claims. (Cl. 181—0.5)

1

This application is a division of my copending application, Serial No. 449,178, filed June 30, 1942, upon which U. S. Patent 2,384,868 was granted September 18, 1945.

This invention relates generally to reverberation indicators and particularly to a new and improved method of and means for providing a direct indication of the sound decay characteristics of an acoustic chamber.

Heretofore, various methods have been used for measuring the sound decay characteristics in sound studios. However, the systems known in the prior art either require comparatively complicated apparatus, or provide an indication which requires computation to ascertain the sound decay characteristic.

The instant invention contemplates the use of simple and inexpensive apparatus for indicating directly the sound decay characteristics of a studio as a function of the voltage applied to the control electrode of a thermionic tube including an anode circuit which has the same time constant as the time constant of sound decay in the studio. By suitably choosing the thermionic tube, and the associated circuit values, the voltage applied to the tube may provide a direct indication of the tube anode resistance, thereby permitting the calibration of the indicating meter in seconds of sound decay time constant, which is proportional to the instantaneous anode resistance of the thermionic tube.

By providing sufficient gain in the sound translating circuits, the reverberation may be measured over a minimum period of approximately two seconds, during which time the actual sound decay in a relatively "dead" studio would be in excess of 60 db. Since some indicating systems used heretofore have lacked volume range, the actual time during which observations could be made has in many cases been limited to a small fraction of a second, thereby reducing the accuracy of such indications.

Briefly, the system to be described includes a means for producing and interrupting a continuous audible sound, of constant amplitude, within the studio. The reproduced sound, and the reverberation produced thereby, is detected by a standard microphone, amplified and rectified and combined, at a predetermined level, with a constant D.-C. standard voltage. The combined voltages are applied to the control electrode of a thermionic vacuum tube having at least a cathode, a control electrode and an anode. The anode is grounded, and is connected through a capacitor of predetermined value to the cathode. A meter

2 for measuring the applied control electrode potential is connected between the control electrode and the cathode.

Among the objects of the invention are to provide an improved method of and means for indicating directly the sound decay characteristics of a studio. Another object of the invention is to provide an improved method of and means for indicating directly the sound decay characteristics of the studio, as a function of voltages derived from a sound translating device, combined with a bias voltage, and applied to the control electrode of a thermionic vacuum tube whose anode circuit time constant adjusts itself to equal the time constant of decay in the studio. Another object is to provide a direct reading reverberation meter circuit having sufficient range for the measurement over a sound range of the order of 60 db. of the sound decay characteristics of a studio.

The invention will be described in detail by reference to the accompanying drawing of which Figure 1 is a schematic diagram of one embodiment of the invention, and Figure 2 is a graph illustrating the operation of the invention.

Referring to the drawing, a studio 1 is provided with a sound source, which may be a reproducer 2 designed to establish constant amplitude sounds. The reproducer may be energized by an audio oscillator 3, the output of which may be interrupted by a key 4. A sound translating device 5, which may be a microphone of any well known type, is connected, through a pre-amplifier 17 and a gain control 6, to the input of an audio amplifier 7 having desired gain and power characteristics. This apparatus may comprise customary studio sound pickup equipment. The output of the audio amplifier 7 is applied to the input of a conventional rectifier 8 comprising, for example, a diode or a diode-connected triode. The output of the rectifier, comprising pulsating, preferably filtered, direct current having a voltage preferably in excess of 200 volts, is applied across a second potentiometer 9.

The positive terminal of the second potentiometer 9 is grounded. The sliding contact of the second potentiometer 9 is connected to the cathode of a diode rectifier 10, and to the control electrode of a triode thermionic tube 11. The negative terminal of a source of constant D.-C. potential 12, for example, a battery, is connected to the anode of the diode rectifier 10. The positive terminal of the constant D.-C. potential source 12 is connected to the cathode of the triode thermionic tube 11.

A capacitor 13, of predetermined value, is connected between the cathode of the triode thermionic tube 11 and ground. The anode of the triode thermionic tube 11 is grounded. A suitable meter 14 and a second capacitor 15 are connected between the control electrode and the cathode of the triode thermionic tube 11. The anode-to-cathode resistance of the triode thermionic tube 11 is represented by the resistor 16 shown in dash lines.

In operation, a steady audio signal is introduced into the studio by the reproducer 2, and at a desired instant, is interrupted by opening the key 4 in the reproducer circuit. Before the key is opened, the gain control potentiometers 6 and 9 are adjusted to provide a D.-C. voltage at the point V of the order of 200 volts. The negative potential derived from the sliding contact of the second potentiometer 9 will, by means of the diode rectifier 10, drive the cathode of the triode 11 to almost 200 volts below ground, if the battery voltage is chosen so that the control electrode will be sufficiently more negative to just block off the anode current of the triode 11.

If it is assumed that the sound decay characteristic in the studio is logarithmic $$\left(E/E_0 = e^{\frac{-t}{T}}\right)$$

where E is the sound density at time $t$ after decay has commenced, $E_0$ is the original sound density, $e$ is the natural logarithmic base, $t$ is the time of sound decay, and $$T = \frac{4V}{cA}$$

where V is the volume of the studio, $c$ is the velocity of sound and A is the total number of Sabine absorption units exposed to the sound. Then the voltage V will decay likewise. As the voltage at the negative terminal of the rectifier falls, i. e., approaches ground potential, the resultant voltage is applied to the control electrode of the triode 11. As the grid voltage approaches ground, the capacitor 13 will tend to maintain its charge and will tend to maintain the cathode of the triode 11 at its previous potential. Since the grid voltage is approaching ground the triode 11 becomes conducting, thereby tending to bring the cathode potential up toward the grid potential. Should the triode 11 draw too much anode current so that the cathode potential tends to rise above the control electrode potential at a given instant, the tube will tend to cut off until the control electrode potential again rises to the point of equilibrium. The effect of these potential variations will be an automatic compensation of the anode resistance of the triode 11 to a value such that the time constant (RC) of the anode circuit is equivalent to the time constant of the sound decay in the studio. As this automatic compensation is obtained, the cathode and control electrode potentials will automatically tend to equalize.

If the tube and associated circuit values are properly chosen, the grid bias, as indicated by the meter 14, will be a direct indication of the time constant of the anode circuit. This characteristic follows because the time constant is proportional to the resistance of the anode circuit (which is varying) and to the capacity (which is constant). The meter 14 may be calibrated in "seconds" of time constant. If a tube having a remote cut off potential is used, suitable well known circuit modifications will permit the use of a logarithmic meter scale covering a wide range. The capacitor 13 may be also varied to provide an instrument having several useful ranges. Since the indication provided by the meter 14 will be significant only during the actual sound decay interval in the studio, the meter must be read during this interval. As explained heretofore, the circuit described may be readily designed to cover a range of the order of 60 db., thereby providing a significant and steady meter reading for approximately 2 seconds after the key 4 is opened. The values mentioned heretofore are for a very "dead" studio, and in most instances the significant or steady meter reading may be observed for substantially longer intervals.

Fig. 2 is a graph indicating the grid potentials (as indicated on the meter 14) with respect to time. As explained heretofore, the meter may be calibrated in seconds of time constant of sound decay. Curve A is an indication for one predetermined reverberation while curve B is a similar indication for a second predetermined reverberation. The substantially flat portion, of the curves A and B, between the dash lines, is the time interval during which significant indications may be observed.

In Fig. 1, an anode battery 18 may be inserted, by means of the switch 19, between the anode of the triode 11 and ground. By proper selection of the triode 11, with this arrangement, the significant portions of the graphs A and B may be made extremely flat, since during the useful observation interval, the tube transconductance will be substantially constant. With the switch in either position, the anode resistance of the tube 11 is substantially constant during the interval of significant or steady meter reading.

I claim as my invention:

1. The method of measuring reverberation of sound waves in a closed chamber by means including a thermionic tube, comprising translating said sound waves into potentials proportional to the amplitude of said waves, applying said potentials to said tube to vary the anode resistance thereof, and indicating the time constant of said tube anode circuit in terms of sound decay time.

2. The method of measuring the reverberation time of sound waves by means including a thermionic tube having a reactive anode circuit, comprising translating said sound waves into alternating potentials characteristic of the amplitudes of said waves, rectifying said potentials, applying said rectified potentials to said tube to vary the anode resistance thereof, and indicating the time constant of said tube anode circuit in terms of sound decay time.

3. The method of measuring the reverberation time of sound waves by means including a thermionic tube having a reactive anode circuit, comprising translating said sound waves into alternating potentials characteristic of the amplitudes of said waves, rectifying said potentials, normally biasing said tube to anode current cut-off condition, applying said rectified potentials to said tube in opposite polarity to said bias to vary the anode resistance of said tube, and indicating the time constant of said tube anode circuit in terms of said reverberation time.

EDMOND S. WINLUND.